June 26, 1928.

P. T. WEEKS ET AL

RECTIFIER TUBE

Filed Feb. 10, 1925

1,675,073

INVENTOR
PAUL T. WEEKS
CHARLES E. HUFFMAN
BY
ATTORNEY

Patented June 26, 1928.

1,675,073

UNITED STATES PATENT OFFICE

PAUL THORNE WEEKS, OF CALDWELL, AND CHARLES EDGAR HUFFMAN, OF MONTCLAIR, NEW JERSEY, ASSIGNORS TO WESTINGHOUSE LAMP COMPANY, A CORPORATION OF PENNSYLVANIA.

RECTIFIER TUBE.

Application filed February 10, 1925. Serial No. 8,113.

The present invention relates to rectifiers for electrical currents for converting alternating currents into direct currents and more particularly to a mount for supporting the various elements of a tube employed in such type of rectifier.

Rectifiers of the vacuum type to which the present invention relates are adapted to supply the necessary direct current for use in connection with what is termed the plate voltage for a radio tube as used in connection with wireless receiving apparatus.

The plate current for radio receiving apparatus had heretofore generally been supplied from batteries which, however, are not an efficient source of electrical energy and in the case of receiving apparatus where many tubes are employed, the use of batteries becomes relatively costly due to the replacements or frequent rechargings. It is desirable, therefore, that apparatus be provided whereby the alternating current of the ordinary lighting circuit may be converted to direct current for use as a plate voltage current in radio tubes.

The rectifier to which the present invention relates is constructed to give a full wave rectification with a single anode and two filamentary cathodes. The rectifier tube rectifies both halves of the alternating current wave and in connection with a suitable filter circuit of inductances and condensers, operates to supply a steady direct current at high potential.

An object of the invention is to provide an improved mount for a rectifier tube which may be expeditiously and economically manufactured.

Another object of the invention is to provide a mount upon which a plurality of electrodes are supported with a minimum of supporting members.

A further object of the invention is to provide a mount having support members common to a plurality of electrodes.

A further object of the invention is to provide a rigid and durable supporting structure for a plurality of electrodes arranged to properly space the same and maintain a spaced relation against impact or jar.

Other objects and advantages will be apparent as the description proceeds.

Ordinarily, in an electrical device necessitating the disposition of the several electrodes in rigid space relation, it is the practice to provide what is termed a flare tube, an end of which is fused to embed a plurality of supports which terminate in conductors and which serve to hold the electrodes which may be clamped or welded thereto. Under ordinary conditions where the electrodes are of comparatively light weight and where no great degree of accuracy is necessary, it is a simple matter to properly mount the electrode elements.

In a device of the present type, however, in which a relatively heavy plate structure must be supported from vibration and in which a plurality of filaments must be held in a given space relation to the plate, the precise and exact supporting of the elements becomes a problem not easily solved.

In order to maintain constant the relative characteristics of the device, it is necessary that the structure of the mount be such as to prevent any variation in the space relation of the elements. Furthermore, in a device of the present type which employs two V-shape filaments, each of which require inlet and outlet conductors, the difficulties are more pronounced. Each filament also requires a supporting member at the upper end, thus multiplying the number of supports required. In addition, in order that the plate may be rigidly held in position, at least two more supports are generally required and ordinarily in a plate construction, such as employed in the present type of tube, difficulty is found in providing suitable space for the many supports and leads upon which the several electrodes are mounted.

It is desirable that supporting members or their conducting wires pass through the compressed portion of the stem to provide a practical construction of tube. This construction, however, increases the possibility of vacuum leaks by reason of poor wetting between the glass and the wires. Leakers from such cause are very difficult to detect and it is, therefore, desirable to reduce the number of supports to avoid any unnecessary insertion of metal into the press making it necessary to crowd the supports closer together, In vacuum devices supporting electrodes particularly of the type which employ a rectangular shaped member, it has been the practice to position the members in substantially the same plane as the flattened portion of the press.

In the present construction, however, considerable advantage has been derived and an economy of room attained by disposing the elements, as a whole, in a plane substantially at right angles to the press.

The present structure includes two comparatively heavy support members which carry a plate having triple walls to provide two compartments for the reception of a pair of V-shape filaments. The ends of the filaments may be connected to support members embedded in the press and the upper ends of the filaments may be connected to supplemental supports mounted in insulating connectors and associated with the supports which carry the plate.

The invention will be more fully understood by reference to the accompanying drawing, in which Fig. 1 is a side elevational view of a rectifier tube having a mount embodying the present invention;

Figure 5:
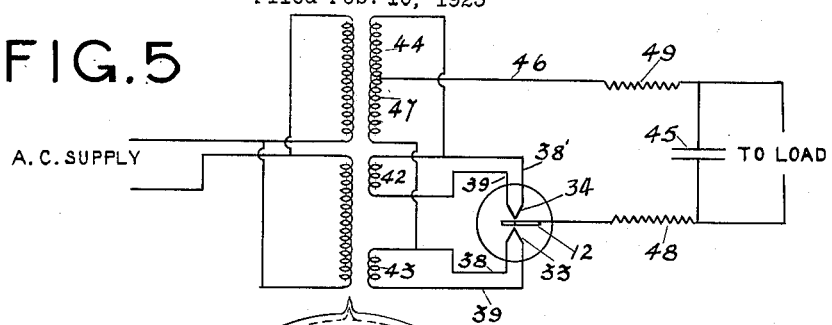
Fig. 5 is a diagrammatic view showing the rectifier tube in connection with a suitable filter circuit.
Figure 1:
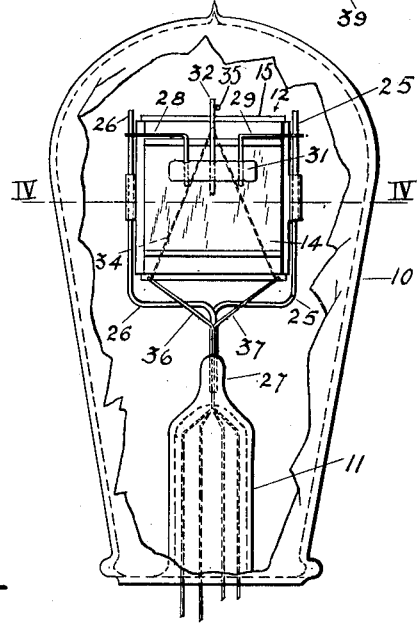
Figure 2:
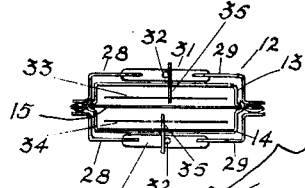
Fig. 2 is a top view of the mount shown in Fig. 1.
Figure 4:
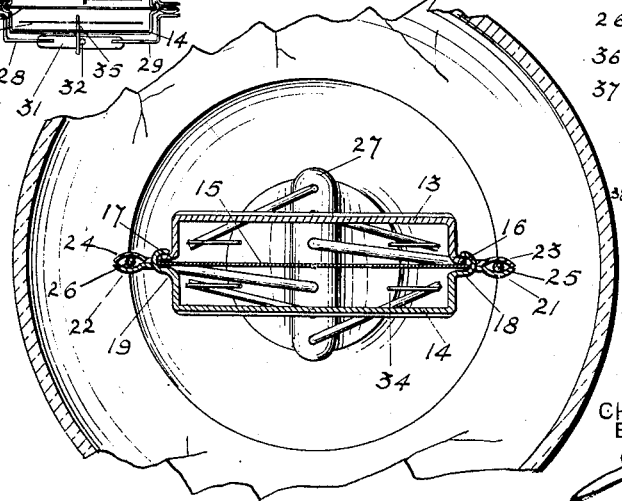
Fig. 4 is an enlarged view taken on line IV—IV in Fig. 1.
Figure 3:
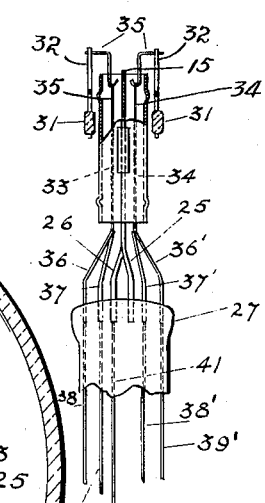
Fig. 3 is an edge view of the mount shown in Fig. 1, including a portion of the press.

The present invention is shown as applied in an evacuated envelope 10 having a flare tube 11 united thereto in the usual manner. The mount may comprise a plate 12 consisting of trough-shaped sections 13 and 14 positioned to constitute an enclosure and having a plate or section 15 so positioned as to divide the enclosure making two separate compartments. The trough-shaped member 13 may be provided with flanged edges 16 and 17 to engage the plate 15 adjacent opposite edges thereof. The trough-shaped section 14 may be provided with extended edges 18 and 19 adapted to be lapped over and compressed upon the flanges 16 and 17 to firmly hold the same in contact with the plate 15 and to secure the three portions of the plate element together.

At opposite sides of each trough-shaped member and intermediate the ends thereof, extended beaded portions 21, 22, 23 and 24 are provided and adapted to be compressed about comparatively heavy support wires 25 and 26.

The plate electrode in the present construction is of oblong outline in transverse cross section and disposed with its long axis transverse to the long axis of a compressed portion 27 of the flare tube 11. The support members 25 and 26 may extend above the beaded portions of the plate element and cross members 28 and 29 may be provided, an end of each cross member being embedded in a non-conductive bead or coupling 31, the opposite ends of the members being welded or otherwise secured to the supports 25 and 26.

The bead 31 may be of lava or glass and a supplemental support member 32 may be inserted therein and adapted to project above the plate to secure the V-shaped end of the filament 33, the opposite side of the plate having corresponding cross members and insulated support to carry a filament 34. Each of the supports 32 may be provided with a resilient hook member 35 upon which the filaments may be hung. The lower ends of the filaments 33 and 34 may be connected to support members 36 and 37 and 36' and 37' embedded in the press 27 and provided with suitable conductors 38 and 39 and 38' and 39', a conductor 41 being provided as an electrical connection for the plate. It will be noted that the filaments 33 and 34 are disposed each in a separate compartment of the plate element and thus operate more efficiently, since a greater effective plate and filament area is provided and are thus screened from each other so that leakage space currents are prevented.

In the diagram of operation, it will be noted that transformer windings 42 and 43 supply alternating current for lighting the two filaments 33 and 34. During half the cycle when the portion 44 of the transformer is making the plate 12 positive with respect to the filament 34, negative electrons pass from the filament 34 to the plate 12 and thence to a smoothing condenser 45 and through the load circuit 46 and transformer. At the same time the plate is negative with respect to the filament 33 and no current can pass between these two.

In the alternating half cycle, the conditions are reversed and the negative electrons flow from filament 33 to the plate, thence through the load circuit and part 47 of the transformer. Thus, during both half cycles, the electrons flow through the load circuit in the same direction; that is, from plate to transformer to filament. The condenser and inductances 48 and 49 serve to reduce the fluctuations in the current flowing through the load circuit.

Certain advantages of the present invention reside in the mobile arrangement of elements with respect to each other and their disposition with respect to the pressed portion of the tube. It will be noted that the construction of the mount is such as to permit the disposition of two pairs of filament conductors spaced a maximum distance apart in order to reduce the tendency of the electric current to leak across from one filament element to the other which are at maximum potential. This desirable disposition of the lead is, in a measure, attained by the disposition of the supported elements in a plane substantially transverse to the plane in which the flattened press is positioned.

The invention also provides for the novel construction of the compartments for the filaments and it will be observed that inasmuch as each filament is disposed upon opposite sides of a plate or section 15, there is a tendency to attract the filaments toward the plate and inasmuch as the filaments must necessarily be lightly held in position and are of light weight, the forces were often effective. With the surrounding structure, however, the forces are equalized and the filament maintained in proper spaced relation to the plate or section 15 and the wall of the surrounding plate 12. This structure has the effect of screening each filament electrostatically from the other so that it tends to prevent electrons emitted by one filament from passing through the space to the second filament, thereby injuriously bombarding and heating the second filament and wasting energy in this leakage space current.

It will be noted that the entire plate is constructed of three members, two of which constitute the enclosure and a dividing member. The surrounding members are mounted on the supports 25 and 26 by welding or clamping and this clamping operation serves to secure the plate or section 15 in position, after which the same may be welded to provide a more positive electrical connection. The supports 25 and 26, therefore, serve, by reason of the supplemental support members 32, as common supporting members for the upper ends of the filaments and for the entire plate.

The present convenient and efficient construction of the mount makes it possible to produce a more durable and effective rectifier tube. It eliminates certain disadvantages and embodies new and desirable features which combine to provide and improve a mount structure for use in electron devices.

Although the present invention is shown and described as employed in connection with a rectifier, it is obvious that certain features of the construction are applicable to other types of tubes, such as radiotrons and to other electrical devices.

Although a preferred embodiment of the invention is shown and described herein, it is to be understood that modifications may be made therein without departing from the spirit and scope of the appended claims.

What is claimed is:

1. An electron-emission device comprising a stem having a press portion, a pair of plates, support members secured to said press, means for securing said pair of plates to said support members so as to provide an enclosure and an intermediate plate supported by said pair.

2. An electron-emission device comprising a stem having a press portion, a pair of plates, support members secured to said press, means for securing said pair of plates to said support members so as to provide a tubular enclosure, an intermediate plate supported by said pair and filaments disposed in operative relation to said plates.

3. An electron-emission device comprising a stem having a press, a plate electrode composed of two plate sections disposed in spaced relation and closed at opposite edges to constitute a tubular enclosure, support members secured in said press for supporting said plate members and an intermediate section positioned between the two first mentioned sections to provide an electrode having a plurality of enclosures.

4. An electron-emission device comprising a stem having a press portion, a pair of plates, support members secured to said press, means for securing said plates to said support members, an intermediate plate secured along opposite edges thereof by said first mentioned plates, a filament and means for supporting the lower end thereof and a supplemental support member for supporting the upper end of said filament, said supplemental member being carried by but insulated from said first mentioned support members.

5. An electrical device comprising an evacuated envelope sealed to a stem, a press portion formed on said stem, an anode, said anode being in the form of a flattened tube and composed of two outer sections secured together to constitute an enclosure and another section secured to opposite walls of said enclosure to divide the same into a plurality of compartments to receive cathodes and means for securing said anode and cathodes to said press in transverse relation thereto.

6. An electron-emission device comprising an anode composed of a plurality of trough-shaped sheet metal plates having extensions capable of interlocking with each other to unite the plates to provide an enclosure and another plate interposed between the first mentioned plates and clamped between the said interlocked extensions.

7. An electrical device comprising an evacuated envelope sealed to a stem, a press portion formed on said stem, an anode composed of two trough-shaped plates having extensions bent to interlock with each other and uniting the plates to provide an enclosure, a third plate positioned between said trough-shaped plates and secured between said clamped extensions, extended beaded portions integral with said trough-shaped plates, support members extending from said press and secured between said beaded portions and a supplemental support member carried by but insulated from said first mentioned support members to secure an end of a cathode.

8. An electrode for an electrical device comprising a pair of plates, flanges on said plates for connecting them together, an intermediate plate engaged by and between said flanges, and means for securing said electrode to support members.

9. An electrode for an electrical device comprising a pair of plates provided with flanges along opposite edges, said flanges being secured together to form a tubular shaped member, a plate disposed within said member and secured in place by having opposite edges clamped between said flanges.

10. An electrical device comprising an evacuated envelope sealed to a stem, a press portion formed on said stem, an anode, said anode being in the form of a flattened tube and composed of two outer sections secured together to constitute an enclosure and another section secured to opposite walls of said enclosure to divide the same into a plurality of compartments to receive cathodes and means for securing said anode and cathodes to said press.

In testimony whereof, we have hereunto subscribed our names this ninth day of February, 1925.

PAUL THORNE WEEKS.
CHARLES EDGAR HUFFMAN.